Sept. 21, 1926.  W. R. GREEN  1,600,628
TIRE CARRIER
Filed Feb. 8, 1923    2 Sheets-Sheet 1
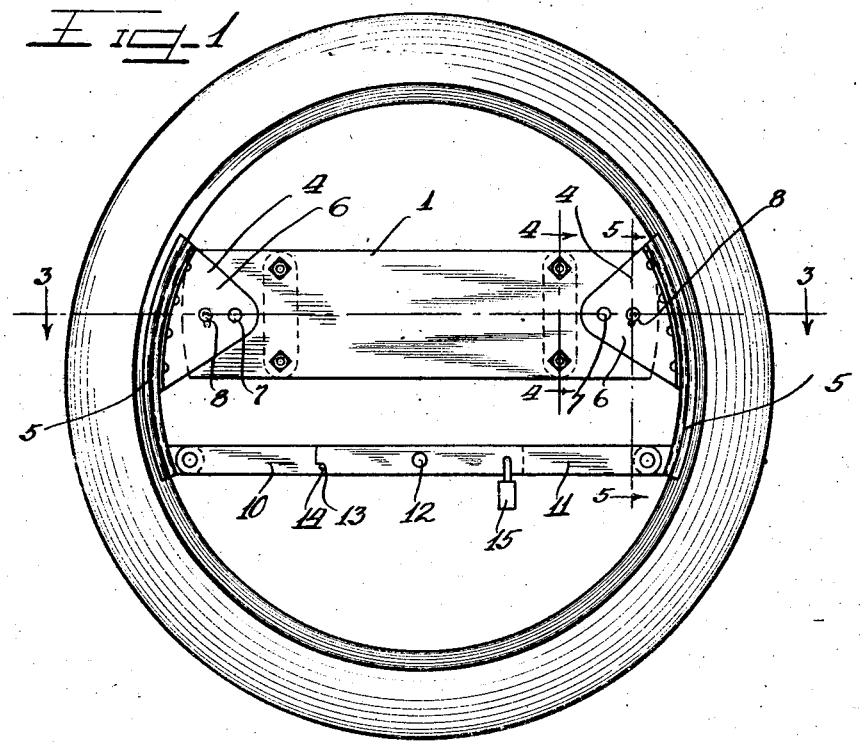
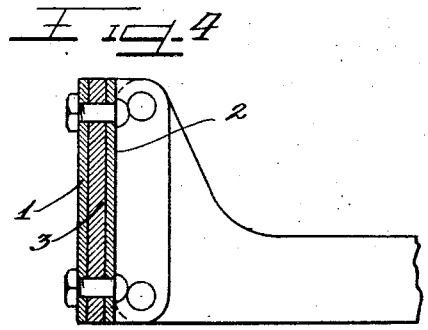
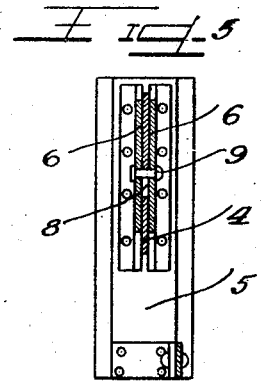
Witnesses
Inventor
WALTER R. GREEN
by
Atty.

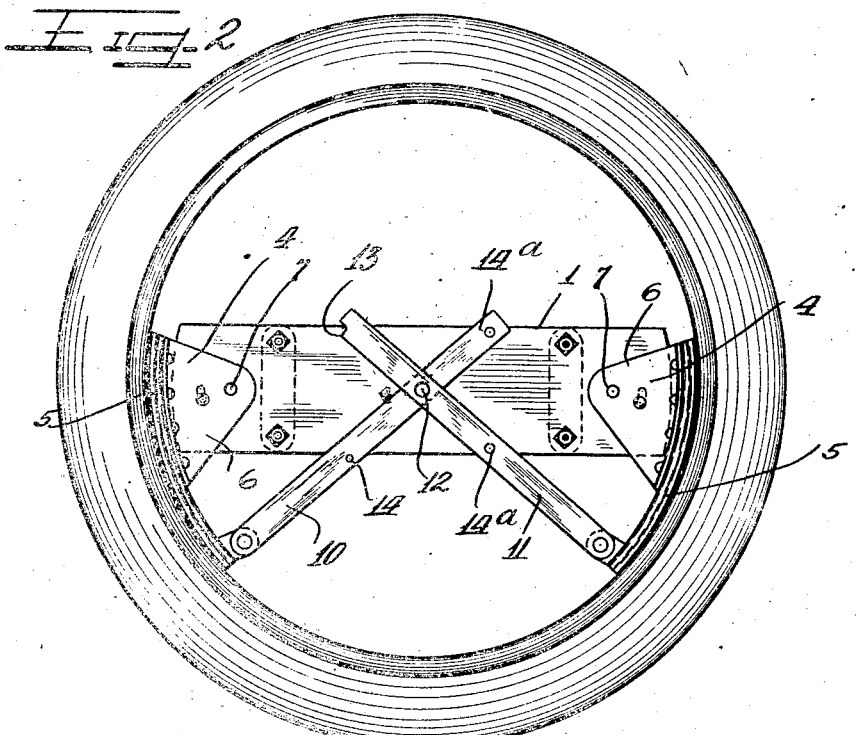
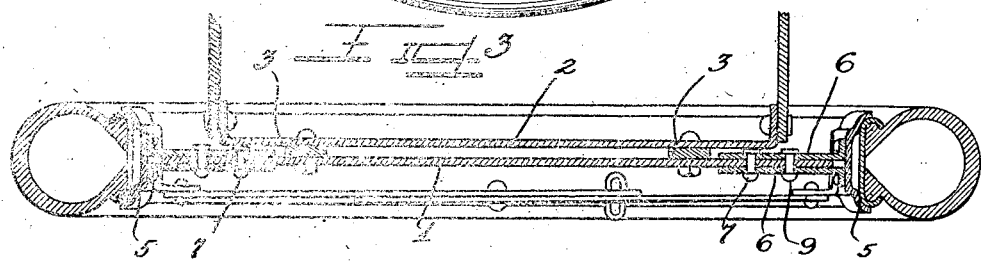
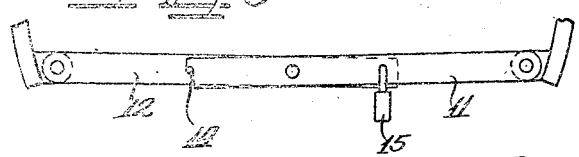

Patented Sept. 21, 1926.

1,600,628

UNITED STATES PATENT OFFICE.

WALTER R. GREEN, OF CHICAGO, ILLINOIS.

TIRE CARRIER.

Application filed February 8, 1923. Serial No. 617,681.

This invention relates to a tire carrier of that type primarily designed for sustaining a tire mounted upon a clincher rim.

It is primarily an object of this invention to provide a carrier upon which a tire may be readily mounted and locked against unauthorized use and from which it may be readily removed.

It is a further object of this invention to provide a carrier having a pair of shiftable elements that may be shifted to different positions for sustaining or removing a tire and means for positively locking said elements in their tire sustaining position.

With these and other objects in view, which will become more apparent in the following description and disclosures in the drawings, this invention comprises the novel mechanism and combinations of parts hereinafter described and more particularly pointed out and defined in the appended claim.

In the accompanying drawings, which illustrate a preferred embodiment of this invention, and in which similar reference numerals refer to similar features in the different views:—

Figure 1 is an elevational view of the carrier with a tire supported thereon.

Figure 2 is a view similar to Figure 1 with parts in different position for removing the tire which is shown partly elevated in the act of removing the same.

Figure 3 is a section on the line 3—3 of Figure 1.

Figure 4 is an enlarged section upon the line 4—4 of Figure 1.

Figure 5 is an enlarged section on the line 5—5 of Figure 1.

Figure 6 is a modification of the toggle links.

As shown on the drawings:

In referring to the drawings, there is shown a support 1 adapted to be bolted to a bracket 2 which in turn is adapted to be attached to the chassis of an automobile, spacing cleats 3 being preferably placed between the support 1 and bracket 2 at the points of attachment.

Tire supporting devices are connected to the ends of said support and are shiftable with respect thereto for receiving a tire thereon and firmly clamping the same thereto, actuating mechanism being connected to said devices for simultaneously actuating the same and a lock is associated with the actuating mechanism for locking the same against unauthorized use.

In the use of the term tire, it should be understood that a tire supported on its rim is included.

In the present embodiment of this invention, the tire supporting devices consist of shoes 4 pivotally attached adjacent the ends of the support. Each shoe consists of an arcuate metal rim 5 fashioned for fitting the inner periphery of a tire and a pair of segmental plates 6 provided with flanges at their outer arcuate surfaces bolted in spaced relation to the upper part of each arcuate rim 5. These segmental plates are so spaced as to receive the support 1 therebetween to which they are pivoted by a bolt 7. Near each end of the support 1, there is an arcuate slot 8, shown in Figures 1, 2 and 5, and pins or bolts 9 extend through said plates 6 and pass through the slots 8 for limiting the pivotal or oscillatory movement of said shoes. The arcuate rims 5 of the shoes extend a considerable distance below the attaching plates 6 or pivot 7, and to the lower ends of these shoes there is attached the above-mentioned actuating mechanism.

This actuating mechanism in the present instance consists of a pair of links or toggle levers 10 and 11 pivotally connected intermediate their ends as at 12 with their outer or remote ends pivoted to the lower ends of the shoe rims 5 by means of suitable lugs on said rims. The link 11 is provided with a notch 13 in its free end for engagement with a stud 14 projecting from the link 10 so that the links cannot be flexed beyond a horizontal alined position, as shown in Figure 1. These links are also provided with holes 14ª which are adapted to be brought into alinement when said links are flexed into a horizontal position, as shown in Fig. 1, for receiving the hasp of a padlcok 15, whereby the links may be locked in such horizontal position against unauthorized operation or use.

When the parts are in the position shown in Fig. 2 with the toggle levers flexed upwardly, it will be noted that the lower ends of the shoes are drawn together or contracted and the upper parts of the shoes lie adjacent the middle of the tire; the shoes having been shifted to their lowermost position, which may be called their inoperative position, in which position a tire may be readily removed or placed thereon. If a tire has been placed thereon, and it is desired to clamp and lock the same thereon, the toggle links 10 and 11 are flexed downwardly into horizontal position and the padlock applied, as is obvious. During the downward flexing of the toggle links the shoes will be shifted or oscillated to their uppermost or operative position with respect to the support 1; the lower portions will be simultaneously expanded and the tire will be automatically shifted relative to the shoes and support 1 to assume the position shown in Fig. 1, where the upper parts of the shoes have been forced into a restricted arc of the tire and the lower portions have been expanded into clamping relation with the tire at the medial and points therebelow, whereby it becomes impossible for an unauthorized person to remove the tire.

In Figure 6, I have shown the forward end of the lever 11 notched-out to such an extent that when it engages the stud 14, the toggle levers will be flexed downwardly from the horizontal so that they will be below dead center. In most cases the weight of the tire itself when the same is placed upon the support will operate the toggle links from the positions shown in Fig. 2 to the position shown in Figs. 1 and 6 and thuswise automatically lock the tire thereon.

I am aware that numerous details of construction may be varied through a wide range without departing from the principles of this invention, and I therefore do not purpose limiting the patent granted otherwise than necessitated by the prior art.

I claim as my invention:—

The combination with a support, of tire supporting shoes pivotally connected thereto, the ends of said support having arcuate slots and said shoes having pins projecting through said slots for limiting the relative oscillatory movements of said shoes with respect to said support, and a pair of links pivotally connected intermediate their ends and operatively associated with said shoes at their remote ends for oscillating the same, said links being capable of actuation into alinement, and a lock for securing the same in alinement against unauthorized operation.

In testimony whereof I have hereunto subscribed my name.

WALTER R. GREEN.